United States Patent [19]

Scheel et al.

[11] Patent Number: 5,054,385
[45] Date of Patent: Oct. 8, 1991

[54] PASTEURIZING CONTROL APPARATUS

[75] Inventors: Fredrick S. Scheel, Racine; Byron Bailey; Richard Lorenzo, both of Kenosha, all of Wis.

[73] Assignee: Custom Control Products, Inc., Racine, Wis.

[21] Appl. No.: 664,338

[22] Filed: Mar. 4, 1991

[51] Int. Cl.⁵ .......................... A23L 3/00; A23C 3/00; A23C 9/00
[52] U.S. Cl. ...................... 99/453; 99/468; 99/483; 99/492; 364/500; 364/510; 422/117; 422/119
[58] Field of Search ................. 99/452, 453, 455, 467, 99/468, 470, 483, 485, 486, 492, 516; 422/117, 119, 20; 364/500, 510, 580, 148, 188; 251/369; 426/520-522

[56] References Cited

U.S. PATENT DOCUMENTS

| | | | |
|---|---|---|---|
| 4,144,804 | 3/1979 | O'Keefe et al. | 99/452 |
| 4,204,956 | 5/1980 | Flatow | 422/119 |
| 4,310,476 | 1/1982 | Nahra et al. | 99/453 |
| 4,313,370 | 2/1982 | Skoli et al. | 99/483 |
| 4,416,194 | 11/1983 | Kemp | 99/453 |
| 4,419,301 | 12/1983 | Nahra et al. | 99/467 |
| 4,479,423 | 10/1984 | Schwitters | 99/455 |
| 4,591,463 | 5/1986 | Nahra et al. | 99/453 |
| 4,597,876 | 7/1986 | Hall | 422/20 |
| 4,841,457 | 6/1989 | Clyne et al. | 364/557 |
| 4,931,938 | 6/1990 | Hass | 364/510 |

OTHER PUBLICATIONS

Tri-Clover Flo-Diversion Valve-Ladish Co., Kenosha, Wis., 53141, Brochure 262-121, date unknown.

Primary Examiner—Timothy F. Simone
Attorney, Agent, or Firm—Jansson & Shupe, Ltd.

[57] ABSTRACT

The improved milk pasteurizing control apparatus is of the type having a flow diversion valve controller in an enclosure with a door, panel or the like required to be sealed on the outside of the enclosure by a regulatory official. Such seal is applied only after the official is satisfied that the controller and its control routine is operating properly. The improvement includes a controller with a computer chip for executing a control routine programmed in the chip. A barrier, overlay or other obstructing technique within the enclosure "blocks" access to the chip program and prevents alteration of the routine. If the exterior seal is broken (to perform certain types of maintenance, for example), the door may be re-sealed by the official without again testing the entire control routine.

28 Claims, 5 Drawing Sheets

PASTEURIZING CONTROL APPARATUS

Field of the Invention

This invention is related generally to systems for processing liquids and, more particularly, to such systems for pasteurizing milk.

Background of the Invention

Systems for pasteurizing raw milk are widely used throughout the world. Such systems help assure that milk suitable for human consumption, sold as "Grade A" milk in the United States, has been processed in a particular way to achieve pasteurization. The Milk Safety Branch of the U.S. Food and Drug Administration (FDA) has established standards governing the construction and operation of such systems Such standards are extremely strict and well enforced by a network of regulatory officials. In fact, most milk producers are well aware of the problems that might arise from selling tainted milk and carefully adhere to such standards in operating pasteurizing systems.

That such standards are highly effective in protecting the public health is evidenced by the fact that at least in the U.S., milk-borne diseases are all but unknown. And other milk-producing countries recognize the efficacy of the FDA standards to such an extent that they have become de facto international standards widely adhered to outside the U.S.

Modern pasteurizing systems are of the type known as high temperature short time (HTST) systems. In such systems, milk is maintained at the relatively high temperature of about 162° F. for a minimum of about 16-17 seconds. Milk which has been subjected to such process is known to be pasteurized.

Such pasteurizing systems may be broadly divided into two portions, namely, handling and treating equipment and pasteurizing control apparatus. The former includes, among other components, holding tanks and piping which flow milk to heating devices where pasteurization occurs. The latter includes means such as a flow diversion valve which receives milk from the handling and treating equipment. Under certain predetermined, precisely-defined circumstances which evidence that pasteurization has occurred, such valve means is controlled to direct milk into a receiving tank for later placement into containers for sale. If pasteurization has not occurred or if, for example, pasteurized milk is to be drawn off for inspection rather than sale, the valve means is controlled to direct milk through piping other than that to the receiving tank. For example, if pasteurization has not occurred, milk is usually "recycled" back into a tank for re-processing.

The importance of a properly-controlled flow diversion valve means cannot be overstated. That is, the integrity of the valve controller is a fundamental determinant as to whether the milk sold to the public is pasteurized. In fact, controllers used with such flow diversion valves are often called "public health controls" for obvious reasons.

A number of parameters are used to control the operation of such valve including temperature, selector switch settings, the status (i.e., open or closed) of certain electrical circuits and time lapses. And many of the controlling "events" are required to occur in a prescribed sequence.

To help assure that only pasteurized milk is offered for sale, a regulatory official witnesses the operation of the valve controller and verifies that such operation is as prescribed. Once such operation is verified (or "certified" as it is often called), the controller enclosure is sealed with a non-reusable seal of a common type having a looped length of wire, the ends of which are joined by lead. If such seal is cut or otherwise broken for any reason, however minor, the milk producer is required to summon the official who must again recertify the operation of the entire control "routine."

Re-certification is expensive and time-consuming in that many operating sequences of the pasteurizing system including that of the flow diversion valve controller must be checked. During this activity, the system is unproductive and the adverse financial consequences significant.

Known controllers are characterized by certain disadvantages. For example, the prescribed routine for controlling the flow diversion valve is implemented by a number of electromechanical devices such as relays, timers and (in some cases) solenoids mounted within the enclosure and connected together by wiring. Proper operation of the controller depends upon the reliable operation of such devices. Such electromechanical devices have electrical coils, contacts and moving parts which burn out or wear out over time and must be replaced. An example of such a controller is shown and described in a bulletin published by Ladish Co. of Kenosha Wisconsin and titled, "Tri-Clover Flo-Diversion Valve."

In the event of such failure, the enclosure seal must be broken, a troubleshooting "diagnosis" must be made and necessary repairs effected, often within the enclosure itself. If a timer fails, the replacement timer must be set to provide the same timing period as the one replaced. Even if the problem is as simple to repair as a loose wire connection on a relay—and there are many such wiring connections in a conventional controller—one cannot do so without breaking the seal and opening the enclosure door. Time-consuming recertification must necessarily follow since such timers, relays and solenoids are at the heart of the control routine used to determine when milk is pasteurized and saleable.

To state the problem another way, known controllers have no way to assure a regulatory official to a high degree of certainty that the control routine has not been altered. Neither do such controllers provide a visible indication to such official that the routine may have been altered. In view of the possible adverse consequences to public health, the official has no choice but to re-check the control routine in detail each time the exterior door seal has been broken.

Yet another disadvantage of known controllers is that most are configured or "dedicated" for operation with a particular flow diversion valve. When sold new, such controllers and valves are sold as "sets" and replacement valves are recommended to be of the same brand and type as the original. This can be very disconcerting to a milk producer who needs a particular replacement valve—only to find that such valve is "out of stock."

In addition to those relays, timers and the like which are used in the aforementioned controller, pasteurizing control apparatus also has a number of other components (including the flow diversion valve) which fail from time to time. Frequently, the precise location of a failed or improperly-operating component is difficult to ascertain. In such event, it is often necessary to open the enclosure for troubleshooting or diagnostic purposes.

And if repair is being attempted by one inexperienced in such matters, it is easy to impair the control routine by, for example, altering a timer setting which often can be by a simple screw adjustment. And such untoward eventualities are rarely evident from a visual inspection.

Irrespective of whether the failure was of a device within the enclosure or otherwise, the controller must be re-certified since the outer seal has been broken and there is nothing within the enclosure to prevent inadvertent or intentional alterations. Such eventualities causes unnecessary downtime and delay.

Objects of the Invention

It is an object of this invention to provide an improved pasteurizing control apparatus which overcomes some of the problems and shortcomings of the prior art.

Another object is to provide such an improved apparatus which avoids the necessity of re-testing the control routine with each breaking of the enclosure seal.

Another object is to provide such an improved apparatus which prevents alteration of the control routine.

Still another object is to provide such an improved apparatus indicates whether a control routine may have been altered.

Yet another object is to provide such an improved control apparatus which permits troubleshooting without opening the controller enclosure.

Another object is to provide such an improved control apparatus which is not required to be used with a particular brand of flow diversion valve.

These and other important objects will be apparent from the descriptions of this invention which follow.

Summary of the Invention

The invention is responsive to a long-felt need for a pasteurizing control apparatus arranged to avoid the time-consuming necessity of having a control routine checked in detail by a regulatory official each time the outer seal on the apparatus enclosure has been broken. Avoidance of such checking saves a great deal of time and makes the pasteurizing system—and the official—more efficient.

Other manufacturers have presented solid state, microprocessor-based control apparatus to the FDA but have failed to gain acceptance thereof. Insofar as is now known, the inventive apparatus is the only one presently found by the FDA to be in total compliance with the pasteurizing milk ordinance (PMO).

The invention involves pasteurizing control apparatus of the type having a flow diversion valve and a valve controller in an enclosure. The enclosure has access means such as a door, a sliding panel or other means permitting entry to the interior of the enclosure. For reasons relating to the integrity of the valve-controlling function performed by the controller, such access means is required to be sealed by a regulatory official. The seal, typically a loop of wire with a connecting piece of lead, is applied on the outside of the enclosure in a manner such that the enclosure and the door are secured together. If the seal is broken as may be required for maintenance, such official must inspect and re-seal the enclosure.

Understanding of the invention will be aided by a brief explanation of aspects of solid-state controllers, i.e., those having no moving parts. A controller having a chip-programmed control routine may be constructed in one or more of several ways which would permit alteration of the routine. For example, such controller may have an electrical connector by which the chip-programmed routine may be "addressed" and altered by a separate computer. Typically (although not necessarily), such connector is mounted at the rear of the controller. Such connector is electrically attached to the chip by a wire inside the controller and extending to the chip "write pin." In the commonly understood jargon, the write pin is that pin on the chip used for alteration of such routine.

Another way to alter the routine is by a "programming port," usually located on the front of the controller to be readily accessible. As with the connector described above, the programming port is electrically attached to the chip write pin. Alteration of the routine is by coupling a programmer to such port. Yet another way to perform such alteration is to remove the programmed chip from the controller and substitute a chip having a different routine. Such removal is by a chip access opening through which the chip may be withdrawn and a different one inserted. For purposes of this explanation, such connectors, ports, openings and any other known or later-developed means usable to alter the chip-programmed routine are individually and collectively referred to as an "interface."

In the improved control apparatus, the controller has a computer chip for executing a chip-programmed control routine and operate the flow diversion valve. Means are provided within such enclosure for preventing alteration of such control routine s that in the event the access means seal is broken, such access means may be re-sealed by such official without testing such control routine. In the improved apparatus, the alteration preventing means includes interior sealing means which must be broken to alter such control routine. Such sealing means may include a barrier or overlay or the like which obstructs or otherwise denies access to an interface. In the case of a controller having an interface accessible only by removing the controller from its enclosure, such interior sealing means includes at least one seal which must be broken to remove the controller.

For controllers having an interface accessible without removing the controller from its enclosure, such interior sealing means may include an obstructing overlay. Such overlay is preferably non-reusable and of a tape-like material which adheres to the controller and must be broken for access.

In the alternative, such interior sealing means may include a barrier such as a panel retained by, for example, one or more lead seals inside the enclosure. Such barrier is arranged to obstruct the interface and its seal(s) must be broken to move the barrier and gain entry thereto. Of course, panel retention may be by an overlay used in place of or in addition to a lead seal.

In another aspect of the invention, the interior sealing means includes a "double obstruction," preferably embodied as both an overlay and a barrier obstructing the interface. As described above, the barrier is attached by at least one seal which must be broken to move the barrier and gain entry to the interface. Such interior sealing means is thereby made redundant. Redundancy is preferred since it gives an enhanced level of "comfort" to the regulatory official that the routine has not been altered.

In a highly preferred embodiment (and irrespective of whether used alone or together), the overlay and panel seal(s) are of the type which visually indicate they have been broken for removal. In that way, a regulatory official can detect the possibility that the control routine may have been altered notwithstanding any verbalized assurances to the contrary. And in the absence of such visual indication, the access means seal on the enclosure door may be re-sealed without testing the control routine.

Redundance of the alteration preventing means may also be by disabling the "write function" of the chip. A preferred way of doing so is by electrically connecting the write pin to a source of constant voltage such as the Vcc voltage line of the controller power supply. Redundancy of the alteration preventing means may also be provided in yet another way, namely, by removal of the wire connection between the connector and/or the programming port and the write pin of the programmed chip. Redundancy is by use of a barrier or overlay (or both) in conjunction with disablement of the write function or wire removal.

Certain controllers include what is referred to as a "diagnostic matrix," i.e., a group of small lights on the front of the controller, the illumination of one or more of which is used in troubleshooting. One or more illuminated lights indicate that a particular component may or may not be working properly. Even with the alteration preventing means described above, apparatus "down-time" may be minimized if trouble-shooting diagnostics can be accomplished without opening the enclosure door. Accordingly, the door or other access means includes a viewing window through which a controller diagnostic matrix is visible. Repairs may thereby be effected without breaking the door seal or other alteration preventing means.

Detailed Description of Preferred Embodiments

Figure 1:
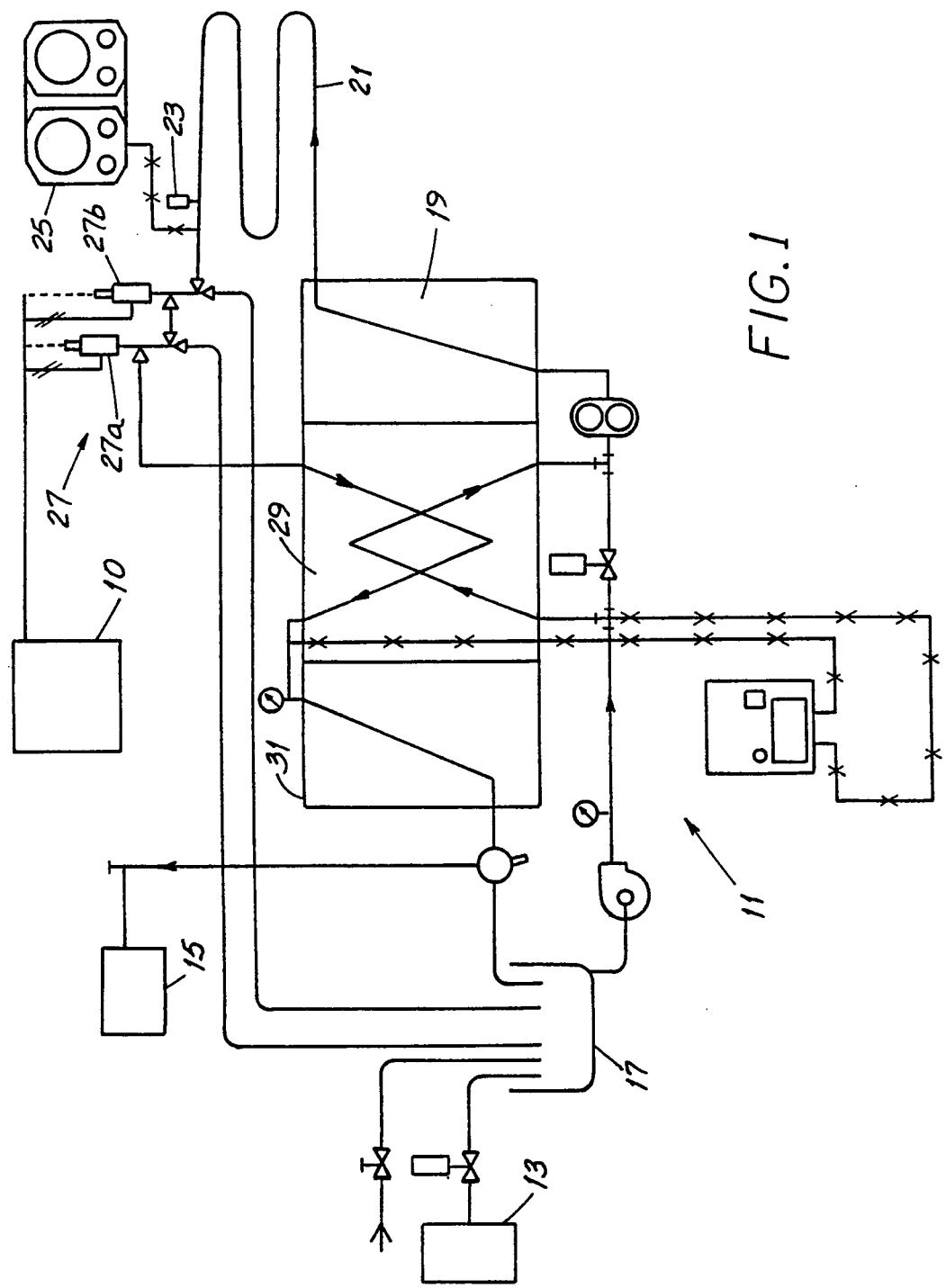
FIG. 1 is a pictorial representation of the improved apparatus shown in conjunction with a milk pasteurizing system.
Figure 2:
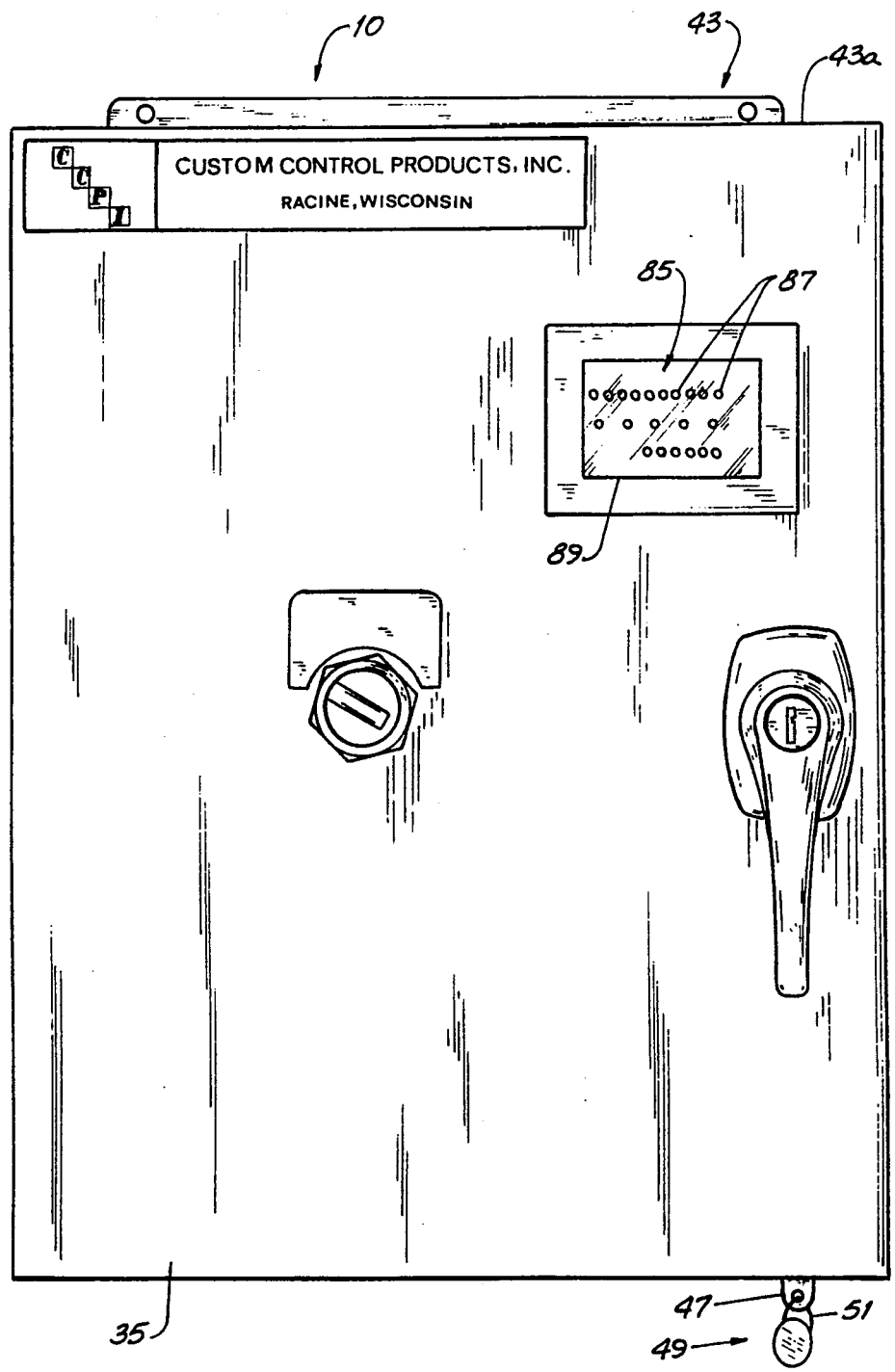
FIG. 2 is a front elevation view of the improved pasteurizing control apparatus with the enclosure door closed.

Referring to FIG. 1, the improved apparatus 10 is shown in conjunction with a milk pasteurizing system 11 which, per se, is known. The system 11 is known as a high temperature short time (HTST) system because of the way pasteurization occurs in it. Such system 11 includes a bulk storage tank 13 for raw milk and a tank 15 for storing milk pasteurized by the system. Raw milk is delivered into a balance tank 17 and from thence is delivered to a milk heater 19 where it is brought to pasteurizing temperature. From the heater 19, it flows to the holding tube 21 where it "dwells" for the prescribed time, nominally 16–17 seconds or perhaps slightly longer. An indicating thermometer 23 displays the temperature of the milk flowing from the tube 21 and a temperature recorder 25 records and controls such temperature.

Assuming the temperature of milk flowing from the tube 21 is as specified, the flow diversion valve 27 (two separate valves 27a, 27b in a common assembly) permits milk to flow through a heat regenerator 29 where heat from the now-pasteurized milk is transferred (without milk intermingling) to raw incoming milk. From the regenerator 29, the pasteurized milk flows through a cooler 31 and thence to the tank 15 for storage.

As shown in FIGS. 2–6, the improved pasteurizing control apparatus 10 is of the type having a flow diversion valve 27 and a valve controller 33 in an enclosure 35. The controller 33 is of the solid-state type; that is, it has no moving parts. A preferred controller 33 is Model SLC100 made by Allen-Bradley Co. of Milwaukee, Wis. Such controller 33 is mounted in the enclosure 35 in a known way using mounting brackets (not shown) and is connected through terminal strips 37 to external devices like the valve 27.

The enclosure 35 has an outer rim 39 with a fastening eye 41 formed thereon and used as described below. The enclosure 35 also has access means 43 such as a door 43a hinged along one edge 45 and having a fastening eye 47 in general registry with that on the rim 39 when the door 43a is closed. It is to be appreciated that as used herein, "access means" may include one or more doors, a sliding panel or any other means movable to prevent and permit entry to the interior of the enclosure 35.

To help guard the integrity of the valve-controlling function performed by the controller 33, such access means 43 is required to be sealed by a regulatory official. The seal 49, typically having a loop of wire 51, is applied on the outside of the enclosure 35 by extending the wire 51 through the eyes 41, 47 and permanently joining the wire ends with a flat lead slug 53. In that manner, the enclosure 35 and the door 43a are secured together. And the door 43a cannot be opened except by cutting or otherwise breaking the seal 49. If the seal 49 is broken (as may be required for maintenance purposes), such official must inspect and re-seal the enclosure 35.

Figure 5:
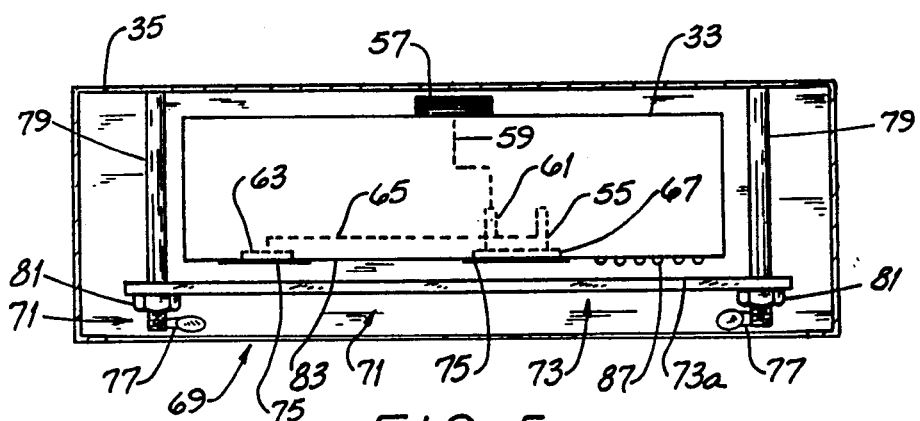
FIG. 5 is a top plan view taken along the viewing plate 5—5 of FIG. 4 with parts omitted and other parts shown in dotted outline.
Figure 6:
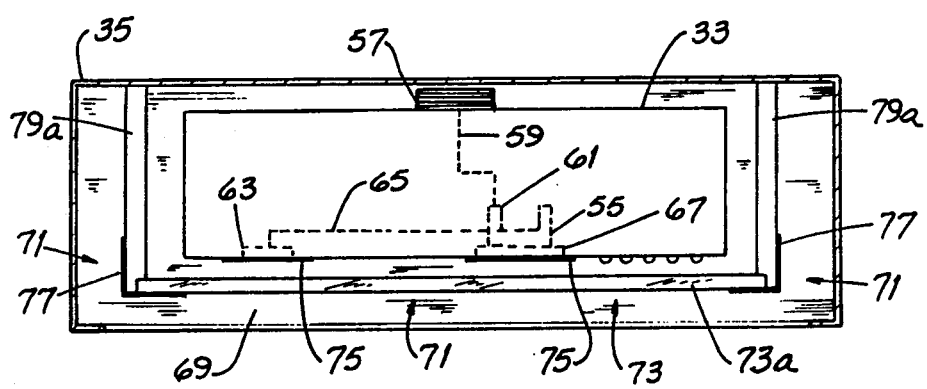
FIG. 6 is a top plan view like that of FIG. 5 showing another embodiment of an aspect of the invention.

Referring also to FIGS. 5 and 6, understanding of the invention will be aided by a brief explanation of aspects of controllers like the controller 33. Such controller 33 may be constructed in one or more of several ways which permit alteration of the routine programmed in the chip 55. For example, such controller 53 may have an electrical connector 57 by which the chip-programmed routine may be "addressed" and altered by a separate computer. Typically (although not necessarily), such connector 57 is mounted at the rear of the controller 33 as shown. Such connector 57 is electrically attached to the chip 55 by a wire 59 inside the controller 33 and extending to the chip "write pin 61." In the commonly understood 3argon, the write pin 61 is that pin on the chip 55 used for altering such routine by "writing" a new program into the chip 55.

Another way to alter the routine is by a "programming port 63," usually located on the front of the controller 33 to be readily accessible. As with the connector 57 described above, the programming port 63 is electrically attached to the chip write pin 61 by a wire 65. Alteration of the routine is by coupling a programmer (not shown) to such port 63. Yet another way to perform such alteration is to remove the programmed chip 55 from the controller 33 and substitute a chip having a different routine. Such removal is by a chip access opening 67 through which the chip 55 may be withdrawn and a different one inserted. For purposes of this explanation, such connector 57, port 63, opening 67 and any other known or later-developed means usable to alter the chip-programmed routine are individually and collectively referred to as an "interface."

In the improved control apparatus 10, means 69 are provided within such enclosure for preventing alteration of such control routine. In the event the seal 49 for the access means 43 is broken, such access means 43 may be re-sealed by a regulatory official without the necessity of testing every aspect of the routine.

Figure 4:
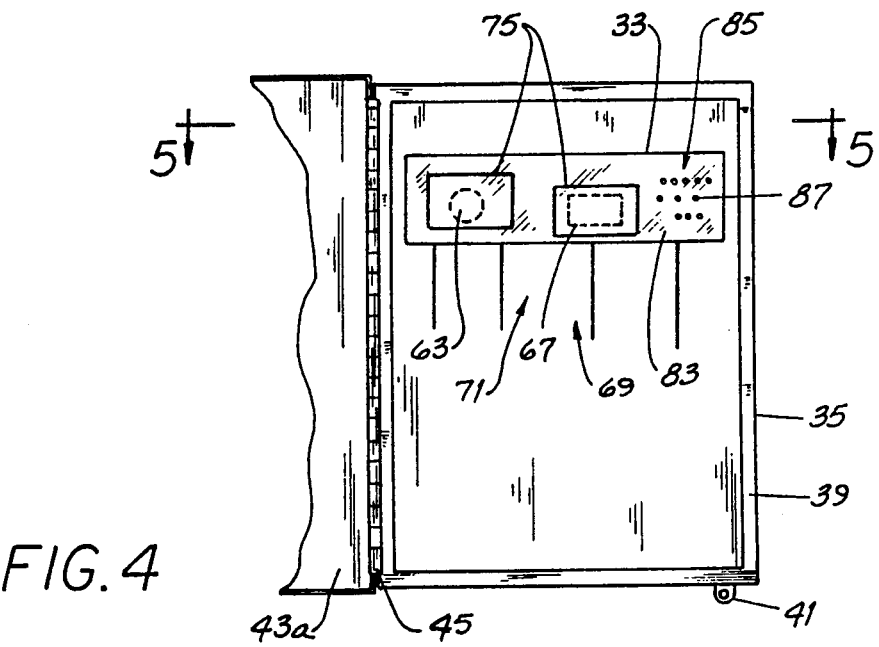
FIG. 4 is a front elevation view similar to that of FIG. 3 (with parts broken away, other parts omitted and still other parts shown in dotted outline) and illustrates other aspects of the invention.

In the improved apparatus 10, the alteration preventing means 69 includes interior sealing means 71 which must be broken to alter such control routine. Referring also to FIG. 4, such sealing means 71 may include a barrier 73 or overlay 75 or the like which obstructs or otherwise denies access to an interface. In the case of a controller having an interface like the connector 57 which is accessible only by removing the controller 33 from its enclosure 35, such interior sealing means 71 includes at least one seal 77 which must be broken to remove the controller 33. For controllers 33 having an interface accessible without removing the controller 33 from its enclosure 35, such interior sealing means 71 may include means such as barrier 73 or overlay 75 for obstructing an interface.

Figure 3:
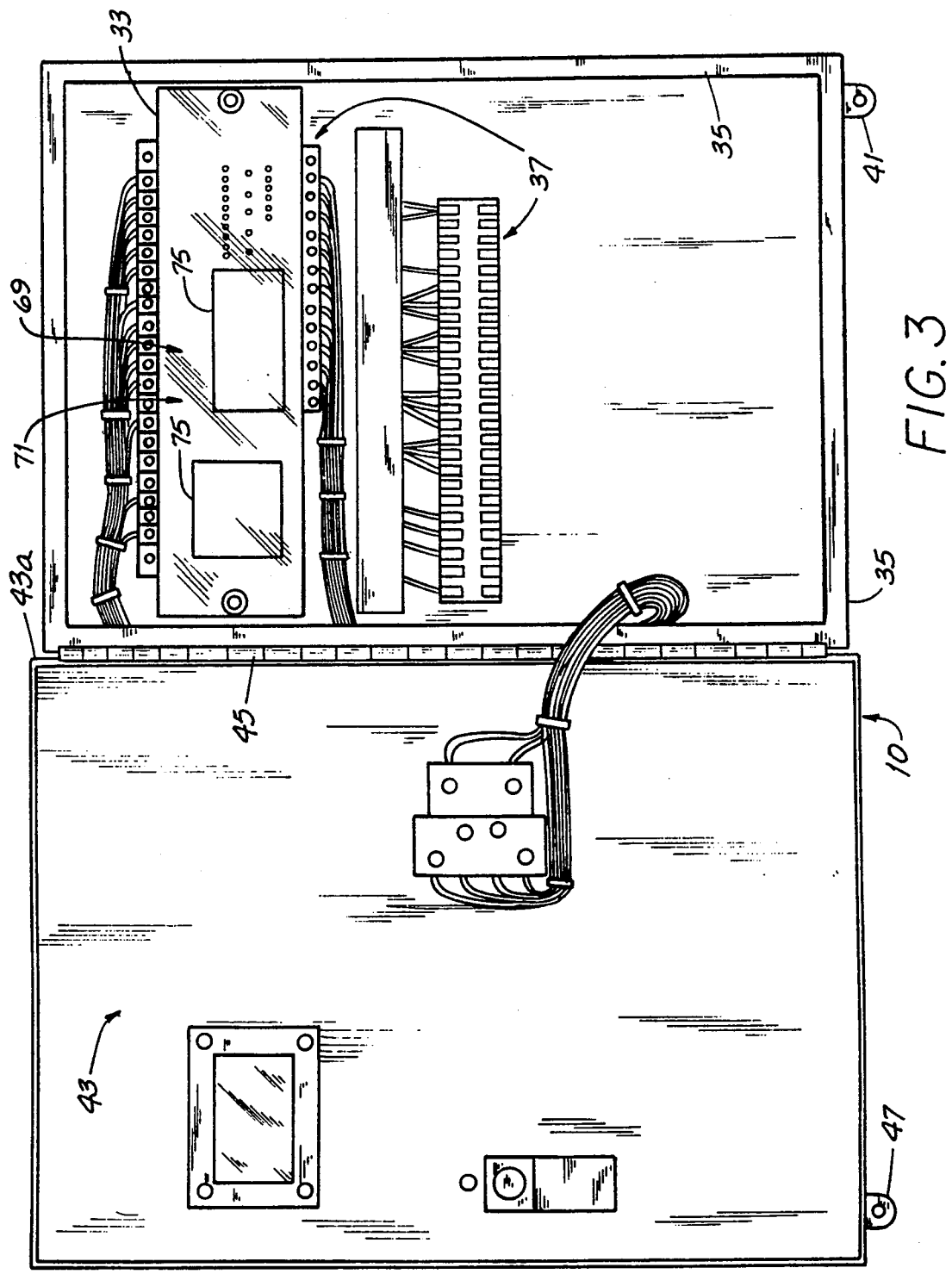
FIG. 3 illustrates certain aspects of the invention and is a front elevation view of the apparatus shown in FIG. 2 with the door open.

Referring particularly to FIGS. 3, 4 and 5, the interior sealing means 71 includes a thin overlay 75. Such overlay 75 is preferably non-reusable and of a tape-like material which adheres to the controller 33, obstructs the port 63, opening 67 or other interface and must be broken for access. In a highly preferred embodiment, such material "self-destructs" when efforts are made to remove it. That is, it can be removed only by tearing it into shreds or by separating its top layer from its adhesive layer, either eventuality being visibly apparent. Such material is used in handling returned goods and in warranty verification. If cartons or equipment factory calibration points are sealed with such material and if the material is intact, the manufacturer will normally permit return of the goods or honor a warranty.

Such interior sealing means 71 may include a barrier 73 such as a panel 73a. As best seen in FIG. 5, the panel 73a is mounted on supports 79, the threaded ends of which extend through the panel 73a. Nuts 81 secure the panel 73a on the supports 79. A hole is drilled through each support 79 adjacent the nut 81 to facilitate attachment of, for example, one or more lead seals 77. Upon startup, the regulatory official checks the system 11 and the apparatus 10 in detail and during that process, the integrity of the control routine is verified. Thereupon, the official installs the lead seals 77.

In the foregoing arrangement, such barrier 73 is arranged to obstruct the port 63, the opening 67 or any other interface formed in the front surface of the controller 33. Its seal(s) 77 must be broken to move the barrier 73 and gain entry to such interface.

As shown in FIG. 6, panel retention may be by one or more seals 77 extending across the panel 73 and a support 79a. Such seals 77 may be embodied as thin, tape-like overlays like overlay 75 and may be used in place of or in addition to a seal like lead seal 49. As with the arrangement of FIG. 5, the seal 77 must be broken to move the barrier 73. Such arrangements are merely non-limiting examples of how breakable seals 77 and a barrier 73 may be used to prevent latent alteration of the control routine and to provide a visual indication that such routine may have been altered.

In another aspect of the invention shown in FIG. 5, the interior sealing means 71 includes a "double obstruction," preferably including both an overlay 75 and a barrier 73 obstructing the port 63 and/or the opening 67. As described above, the barrier 73 is attached by at least one seal 77 which must be broken to gain entry to the interface. Such interior sealing means 71 is thereby made redundant. Redundancy is preferred since it gives an enhanced level of "comfort" to the regulatory official that the routine has not been altered. In a highly preferred embodiment (and irrespective of whether used singly or in pairs and alone or together), the overlay 75 and the seal(s) 77 are of the type which visually indicate they have been broken for removal.

Figure 7:
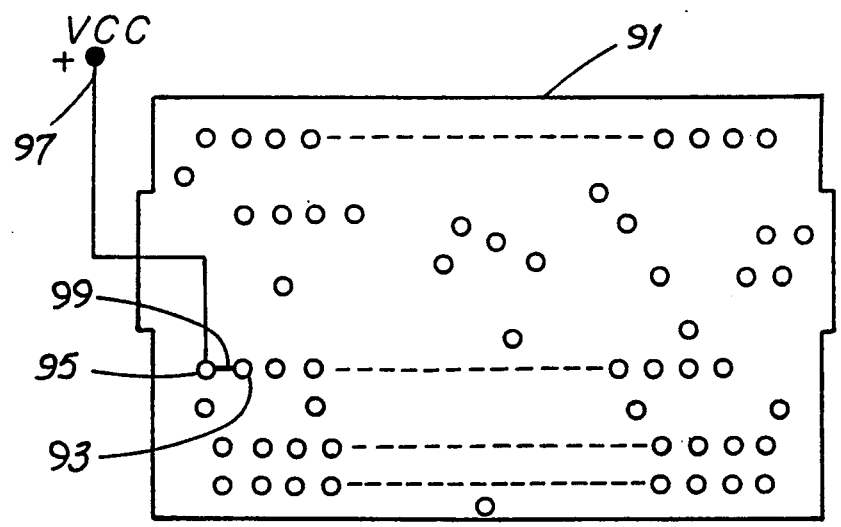
FIG. 7 is a bottom plan view of a printed circuit (PC) board within the controller.

FIG. 7 shows the bottom surface of a printed circuit (PC) board 91 which is a component of Allen-Bradley assembly part no. 1745-MI B. Such board 91 includes pins 93, 95 for connection, respectively, to the write pin 61 and to the Vcc voltage bus 97 of the controller power supply. Redundancy of the alteration preventing means 69 may also be provided by disabling the "write function" of the chip 55. A preferred way to do so is by permanently connecting the pin 93 (and therefore, write pin 61) to pin 95 by a jumper 99, thereby maintaining the write pin 61 at a constant voltage. This prevents such write function from being implemented since "writing into" the chip program requires the ability to switch the write pin 61 between some voltage value and substantially zero volts.

Redundancy of the alteration preventing means 69 may also be provided in another way, namely, by removal of the wire 59 and/or 65 connecting the connector 57 and/or the programming port 63 and the write pin 61 of the programmed chip 55. Redundancy is by use of a barrier 73 or overlay 75 in conjunction with wire removal. And if both a barrier 73 and an overlay 75 are used in conjunction with wire removal, the arrangement within the enclosure 35 may be said to be "double-redundant."

Certain controllers 33 include what is referred to as a "diagnostic matrix 85" having a group of small lights 87 arranged in a multi-row matrix on the front of the controller 33. Such lights 87, used for troubleshooting, are connected so that the illumination of one or more of them quickly identifies a component such as the valve 27 which may be working improperly or not at all. Even with the alteration preventing means 69 described above, apparatus "downtime" can be even further minimized if troubleshooting diagnostics can be accomplished without opening the enclosure door 43a. Accordingly, the barrier 73 is made of a transparent material and the door 43a or other access means 43 includes a viewing window 89 through which the matrix 85 is visible. Repairs may thereby be effected without breaking the door seal 49 or other alteration preventing means 69. And the improved controller 33 may be used with virtually any brand of flow diversion valve 27, thus simplifying the matter of spare valve availability.

While the principles of this invention have been described in connection with specific embodiments, it should be understood clearly that these descriptions are made only by way of example and are not intended to limit the scope of the invention.

We claim:

1. In pasteurizing control apparatus of the type having a flow diversion valve means controller in an enclosure with access means required to be sealed by a regulatory official, the improvement comprising:
such controller having a computer chip for executing a chip-programmed control routine, and;
means within such enclosure for preventing alteration of such control routine;
whereby in the event the access means seal is broken, such access means may be re-sealed by such official without testing such control routine.

2. The apparatus of claim 1 wherein such alteration preventing means includes interior sealing means which must be broken to alter such control routine.

3. The apparatus of claim 2 wherein such interior sealing means includes at least one seal which must be broken to remove such controller from the enclosure.

4. The apparatus of claim 2 wherein such controller includes a programming port and wherein such interior sealing means includes an overlay obstructing such programming port.

5. The apparatus of claim 4 wherein such overlay is a non-reusable, tape-like material adhering to such controller.

6. The apparatus of claim 2 wherein such controller includes a programming port obstructed by a barrier and wherein such interior sealing means must be broken to gain entry to such port.

7. The apparatus of claim 2 wherein such controller includes a chip access opening and wherein such interior sealing means includes an overlay obstructing such access opening.

8. The apparatus of claim 7 wherein such overlay is a non-reusable, tape-like material adhering to such controller.

9. The apparatus of claim 2 wherein such controller includes a chip access opening obstructed by a barrier and wherein such interior sealing means must be broken to gain access to such opening.

10. The apparatus of claim 4 wherein such interior sealing means further includes a barrier obstructing such programming port and attached by at least one seal which must be broken to remove such barrier, whereby such interior sealing means is redundant.

11. The apparatus of claim 7 wherein such interior sealing means further includes a barrier obstructing such chip access opening and attached by at least one seal which must be broken to remove such barrier, whereby such interior sealing means is redundant.

12. The apparatus of claim 2 wherein such chip includes a "write" pin usable for alteration of such control routine and wherein such controller has an electrical connector and is devoid of a wiring connection between such connector and such pin, thereby providing redundant alteration preventing means.

13. The apparatus of claim 4 wherein such chip includes a "write" pin usable for alteration of such control routine and wherein such controller is devoid of a wiring connection between such programming port and such pin, thereby providing redundant alteration preventing means.

14. The apparatus of claim 2 wherein such chip includes a "write" pin usable in a "write function" for alteration of such control routine and wherein such write function is disabled, thereby providing redundant alteration preventing means.

15. The apparatus of claim 4 wherein such chip includes a "write" pin usable for in a "write function" for alteration of such control routine and wherein such write function is disabled, thereby providing redundant alteration preventing means.

16. The apparatus of claim 1 wherein such access means includes a viewing window and wherein such controller includes a diagnostic matrix visible through such window whereby repairs may be effected without breaking such alteration preventing means.

17. In pasteurizing control apparatus of the type having a flow diversion valve means controller in an enclosure with access means required to be sealed by a regulatory official, the improvement comprising:
such controller having a computer chip for executing a chip-programmed control routine, and;
means for visually indicating whether such control routine may have been altered; whereby in the event the access means seal is broken, such access means may, in the absence of such visual indication, be re-sealed by such official without testing such control routine.

18. The apparatus of claim 17 wherein such visual indicating means includes interior sealing means which must be visibly broken to alter such control routine.

19. The apparatus of claim 18 wherein such interior sealing means includes at least one seal which must be visibly broken to remove such controller from the enclosure.

20. The apparatus of claim 18 wherein such controller includes a programming port obstructed by an overlay which must be destroyed to be removed.

21. The apparatus of claim 20 wherein such overlay is a tape-like material adhering to such controller.

22. The apparatus of claim 18 wherein such controller includes a programming port obstructed by a barrier and wherein such interior sealing means must be visibly broken to gain entry to such port.

23. The apparatus of claim 18 wherein such controller includes a chip access opening obstructed by an overlay which must be destroyed to be removed.

24. The apparatus of claim 23 wherein such overlay is a tape-like material adhering to such controller.

25. The apparatus of claim 18 wherein such controller includes a chip access opening obstructed by a barrier and wherein such interior sealing means must be visibly broken to gain access to such opening.

26. The apparatus of claim 20 wherein such interior sealing means further includes a barrier obstructing such programming port and attached by at least one seal which must be visibly broken to remove such barrier, whereby such interior sealing means is redundant.

27. The apparatus of claim 23 wherein such interior sealing means further includes a barrier obstructing such chip access opening and attached by at least one seal which must be visibly broken to remove such barrier, whereby such interior sealing means is redundant.

28. The apparatus of claim 17 wherein such access means includes a viewing window and wherein such controller includes a diagnostic matrix visible through such window, whereby repairs may be effected without breaking such access means seal.

* * * * *

UNITED STATES PATENT AND TRADEMARK OFFICE
CERTIFICATE OF CORRECTION

PATENT NO. : 5,054,385

DATED : October 8, 1991

INVENTOR(S) : Fredrick S. Scheel, Byron Bailey and Richard Lorenzo

It is certified that error appears in the above-identified patent and that said Letters Patent is hereby corrected as shown below:

In column 1, line 17, insert --.-- after systems and before Such.

In column 4, line 30, delete "s" and insert --so--.

In column 6, line 60, delete "3argon" and insert --jargon--.

In column 8, line 22, delete "1745-MI B" and insert --1745-M1 B--.

UNITED STATES PATENT AND TRADEMARK OFFICE
CERTIFICATE OF CORRECTION

PATENT NO. : 5,054,385

DATED : October 8, 1991

INVENTOR(S) : Fredrick S. Scheel, et al

It is certified that error appears in the above-identified patent and that said Letters Patent is hereby corrected as shown below:

Column 10,

Claim 17 should be as follows:

--17. In pasteurizing control apparatus of the type having a flow diversion valve means controller in an enclosure with access means required to be sealed by a regulatory official, the improvement comprising:
- such controller having a computer chip for executing a chip-programmed control routine, and;
- means for visually indicating whether such control routine may have been altered;

whereby in the event the access means seal is broken, such access means may, in the absence of such visual indication, be re-sealed by such official without testing such control routine.--

Signed and Sealed this

Nineteenth Day of January, 1993

*Attest:*

DOUGLAS B. COMER

*Attesting Officer*     *Acting Commissioner of Patents and Trademarks*